United States Patent [19]

Rowland et al.

[11] Patent Number: 5,206,279
[45] Date of Patent: Apr. 27, 1993

[54] METHOD OF PREPARING AQUEOUS DISPERSIONS OF ETHYLENE/α,β-UNSATURATED CARBOXYLIC ACID INTERPOLYMERS

[75] Inventors: Michael E. Rowland, Lake Jackson; Kenneth E. Springs, Clute, both of Tex.

[73] Assignee: The Dow Chemical Company, Midland, Mich.

[21] Appl. No.: 646,134

[22] Filed: Jan. 25, 1991

[51] Int. Cl.$^5$ .............................. C08K 5/05
[52] U.S. Cl. .................... 524/379; 524/556; 524/429; 524/522; 525/329.9; 525/330.2; 525/369; 525/378; 525/380
[58] Field of Search .............. 524/556, 522, 379, 429; 525/329.9, 330.2, 369, 378, 380

[56] References Cited

U.S. PATENT DOCUMENTS

| | | | |
|---|---|---|---|
| 3,347,811 | 10/1967 | Bissot | 524/556 X |
| 3,389,109 | 6/1968 | Harmon et al. | 524/556 X |
| 3,427,280 | 2/1969 | Imhof | 524/556 X |
| 3,472,825 | 10/1969 | Walter et al. | 525/330.2 |
| 3,511,799 | 5/1970 | Clampitt | 524/556 X |
| 3,541,033 | 11/1970 | Buttrick | 524/556 |
| 3,644,258 | 2/1972 | Moore et al. | 524/556 X |
| 3,677,989 | 7/1972 | Jenkinson | 524/556 |
| 3,790,521 | 2/1974 | McCann et al. | 524/556 X |
| 3,798,194 | 3/1974 | McCann et al. | 524/556 X |
| 3,799,901 | 3/1974 | McCann et al. | 524/556 X |
| 3,970,626 | 7/1976 | Hurst et al. | 524/556 X |
| 4,173,669 | 11/1979 | Ashida et al. | 524/556 X |
| 4,410,655 | 10/1983 | Funakoshi et al. | 524/522 |

FOREIGN PATENT DOCUMENTS

89/07519 8/1989 .

Primary Examiner—Joseph L. Schofer
Assistant Examiner—J. M. Reddick

[57] ABSTRACT

Aqueous dispersions of ethylene/α,β-unsaturated carboxylic acid interpolymers (e.g., random ethylene/acrylic acid interpolymers) are formed using a mixture of bases at a concentration of at least about 0.2 equivalents of base per mole of α,β-unsaturated carboxylic acid. The dispersions have at least about 10 weight percent dispersed solids and not more than about 1 weight percent of the initial polymer in non-dispersed form. Preferred bases for use in forming the dispersions are ammonium hydroxide and/or alkali metal hydroxides. A mixture of ammonium hydroxide and potassium hydroxide is especially preferred for forming the dispersions with ethylene/acrylic acid interpolymers at an ammonium hydroxide:acrylic acid molar ratio of about 1:1 and a potassium hydroxide:acrylic acid molar ratio in the range of about 0.6–0.8:1. The dispersions are particularly useful in forming thin coatings of adhesive on substrates, such as paper and metal foil, using conventional techniques.

14 Claims, No Drawings

METHOD OF PREPARING AQUEOUS DISPERSIONS OF ETHYLENE/α,β-UNSATURATED CARBOXYLIC ACID INTERPOLYMERS

FIELD OF THE INVENTION

This invention relates to an improved method of forming aqueous dispersions from ethylene/α,β-unsaturated carboxylic acid interpolymers (e.g., ethylene/acrylic acid). More particularly, the invention relates to a method of forming dispersions which have a high solids content and contain not more than about 1% by weight non-dispersibles.

BACKGROUND OF THE INVENTION

Ethylene/α,β-unsaturated carboxylic acid interpolymers are thermoplastic polymers which are useful as adhesives. An adhesive layer or coating of the interpolymers can be applied to a substrate, such as paper or metal foil, by extrusion coating or other conventional techniques. The coating thickness, however, cannot be reduced much beyond about 0.4 mils, or about 6 pounds per ream, due primarily to the melt strength of the interpolymer. The line speed and the die/system design also affect the ability of the interpolymer to coat the substrate at minimal thicknesses. Generally, such coatings are thicker than necessary to provide the desired properties in a laminate structure. Thinner coatings would be preferred from an economic standpoint.

Thin coatings have been applied to substrates using a gravure or meyer rod technique and an aqueous dispersion of the polymeric adhesive, but the dispersions have been only available at low solids concentrations.

Many methods of forming dispersions from ethylene/α,β-unsaturated carboxylic acid interpolymers are disclosed in the literature. One method involves neutralizing at least portion of the carboxylic acid groups with an alkaline base to form a dispersible carboxylic acid salt. The dispersions formed using this technique, especially when the α,β-unsaturated carboxylic acid content is low or the molecular weight of the interpolymer is high, typically have a high content of non-dispersibles, i.e., greater than 1%. When such dispersions are coated onto a substrate, the coating tends to be uneven and variable and, in addition, can contaminate the equipment due to the high percentage of non-dispersibles. The non-dispersibles gum up the equipment and cause equipment shutdown and subsequent cleanup. If more base is utilized to reduce the non-dispersibles content, the percentage of dispersed solids decreases even further and makes the overall process uneconomical. Dispersions of interpolymers having low carboxylic acid content (e.g., less than about 15% acid content) are particularly difficult to form.

International Patent Application Publication Number WO 89/07519 (Patton et al.) discloses a number of techniques for forming dispersions from ethylene/α,β-unsaturated carboxylic acid interpolymers, including using a combination of alkali metal hydroxide and ammonia solution. Patton et al. did not recognize, nor do they suggest, using a mixture of bases in the proportions set forth below.

SUMMARY OF THE INVENTION

An improved method of forming a dispersion of at least one ethylene/α,β-unsaturated carboxylic acid interpolymer has now been discovered. The method comprises contacting the interpolymer in a stirred aqueous medium with a mixture of bases at a concentration of at least about 0.2 equivalents of base per mole of α,β-unsaturated carboxylic acid, thereby forming novel aqueous dispersions having at least about 10 weight percent (%) of dispersed solids, total weight basis, and not more than about 1 weight percent (%) of non-dispersibles, based on the weight of the interpolymer. The preferred bases are ammonium hydroxide and/or alkali metal hydroxides. Lithium hydroxide, potassium hydroxide and sodium hydroxide are preferred alkali metal hydroxides. The solids content of the dispersion is preferably about 25 weight percent or more, total weight basis.

The adhesive dispersions formed using the method of the present invention can surprisingly be coated onto a substrate at a film thickness as thin as about 0.15 mils (or, when coating paper, about 2.25 pounds per ream) and possibly even thinner. This coating thickness is very desirable from an economic standpoint as well as an aesthetic standpoint, especially when coating cellulosics.

In addition, since the dispersions formed using the method of the present invention have low percentages of non-dispersibles, they cause less equipment fouling.

DETAILED DESCRIPTION OF THE INVENTION

Ethylene/α,β-unsaturated carboxylic acid interpolymers form a known class of compounds, any one of which can be used in the present invention. Mixtures of the ethylene/α,β-unsaturated carboxylic acid interpolymers are useful within the scope of this invention as well. The preferred ethylene/α,β-unsaturated carboxylic acid interpolymer for use in the present invention, however, is a random ethylene/acrylic acid interpolymer. For example, PRIMACOR* Adhesive Polymers made by The Dow Chemical Company are random ethylene/acrylic acid interpolymers suitable for use in practicing this invention.

The interpolymers useful in this invention are prepared by known techniques. Typically, such polymers are interpolymers of ethylene and acrylic or methacrylic acid. Other α,β-unsaturated carboxylic acids suitable for interpolymerization with ethylene for use in the present invention include but are not limited to, e.g., maleic acid and fumaric acid.

One method of preparing such random interpolymers is disclosed in U.S. Pat. No. 3,520,861 (Thomson et al.) and another is disclosed in U.S. Pat. No. 4,351,931 (Armitage), both of which are incorporated herein by reference. Another method is disclosed in U.S. Pat. No. 4,599,392 (McKinney et al. and in allowed U.S. application Ser. No. 07/316,257, both of which are incorporated herein by reference. Non-random ethylene α,β-unsaturated carboxylic acid interpolymers can be prepared by the methods disclosed in U.S. Pat. No. 4,248,990 (Pieski et al.) and in U.S. Pat. No. 4,252,924 (Chatterjee), both of which are incorporated herein by reference. Other methods of manufacturing interpolymers of ethylene and α,β-unsaturated carboxylic acid(s), such as grafting acrylic acid onto an ethylene polymer or copolymer of ethylene as disclosed in U.S. Pat. No. 3,177,269, incorporated herein by reference, is also within the scope of this invention. The term interpolymers used in describing the present invention includes copolymers and terpolymers (e.g., ethylene/n-butyl acrylate/acrylic acid) and other interpolymers.

The molecular weight of the random ethylene/acrylic acid interpolymers useful in forming dispersions in the present invention is indicated as melt index and can be from about 1 gram/10 minutes (g/10 min) to about 5000 g/10 min. The melt index is measured according to ASTM D 1238 Condition E (190° C./2.16 kg). The preferred melt index range of the random ethylene/acrylic acid interpolymer is from about 5 g/10 min to about 300 g/10 min. The methods described herein are particularly effective for forming dispersions from relatively high molecular weight interpolymers (i.e., interpolymers having a melt index of from about 1 g/10 minute to about 30 g/10 minute).

Surprisingly, even ethylene/acrylic acid interpolymers having very low acrylic acid content, as low as about 3% acrylic acid by weight of the interpolymer, can be dispersed using the methods described herein. Accordingly, the acrylic acid content of the ethylene/acrylic acid interpolymers can be from about 3% to about 50% by weight of the interpolymer. The preferred acrylic acid content range of the random ethylene/acrylic acid interpolymer is from about 6% to about 20% by weight of the interpolymer.

In addition, ethylene/acrylic acid interpolymers having either relatively high molecular weights and/or low acid content can be dispersed using the methods described herein.

The mixture of bases useful for forming the dispersions of the present invention can be any that react with the $\alpha,\beta$-unsaturated carboxylic acid functionality, such as alkali metal hydroxides, amines, ammonium hydroxide and various carbonates (e.g., calcium carbonate or sodium carbonate). Amines suitable for practicing the present invention are, e.g., monoethanolamine and diethanolamine. Preferred bases are ammonium hydroxide and/or alkali metal hydroxides. Lithium hydroxide, potassium hydroxide and sodium hydroxide are preferred alkali metal hydroxides. When ammonium hydroxide is used in the invention for forming the dispersion, the most preferred alkali metal hydroxide for forming the mixture is potassium hydroxide. This mixture is effective when mixed at specific ratios sufficient to disperse the interpolymer, particularly at a total ratio of from about 1.5:1 to about 3:1, and especially effective when the ammonium hydroxide:acrylic acid molar ratio is about 1:1 and the potassium hydroxide:acrylic acid molar ratio is in the range of about 0.6–0.8:1.

The alkali metal hydroxides and/or ammonium hydroxide mixture can be formed by mixing together in an aqueous medium in-situ and then contacting with the interpolymer. This in-situ mixing method is preferable to contacting the interpolymer sequentially. The interpolymer can be contacted sequentially first with one of the alkali metal hydroxides, either in an aqueous or non-aqueous environment, and then contacted with another of the alkali hydroxides (or ammonium hydroxide) in an aqueous medium to form the aqueous dispersion.

Added surfactants are not required in forming the novel dispersion, but they can be included along with other conventional additives so long as they do not affect the stability of the formed dispersion. Typical additives include, e.g., pigments, antioxidants, defoamers, wetting agents (e.g., hexanol), and rosin tackifiers (e.g., that disclosed in U.S. Pat. No. 4,714,728 (Graham et al.), incorporated herein by reference).

Preferably, the mixture of hydroxides and interpolymer are agitated or otherwise stirred sufficiently such that the hydroxide mixture readily contacts the interpolymer. The temperature of the stirred hydroxide/interpolymer mixture (i.e., digestion temperature) can be about ambient or above, but is preferably from about 60° C. to about 150° C.

The non-dispersibles of the dispersions formed using the methods of the present invention are characterized by filtering the dispersion through a 100 mesh screen, drying the filtrate and weighing. Percent non-dispersibles is calculated by dividing the weight of the dried filtrate by the weight of the total polymer charged to the system multiplied by 100. The solids content of the dispersions is determined by removing an aliquot of the dispersion, recording its wet weight and subsequently drying under heat until the weight change is minimal. The solids content is recorded as the dry weight of the dispersion aliquot, after removal of non-dispersibles, divided by the wet weight of the aliquot, multiplied by 100. In general, as the solids content of the dispersion increases, the viscosity of the dispersion increases. Practical high solids dispersions can have a viscosity as high as about 2000 centipoise (cps), although lower viscosity dispersions are preferable.

The aqueous dispersions formed using the present invention can be diluted with an aqueous alcohol of 1 to 4 carbon atoms (e.g., methanol, ethanol or isopropanol). The addition of alcohol can speed drying time and consequently increase line speed.

The dispersions of the present invention can be applied to a variety of substrates, including, e.g., cellulosics (e.g., paper sizing or coating), metal foil, metal foil coatings, non-woven fabric coatings and polymeric film. The dispersions of the present invention can be applied using a gravure roll or meyer rod application technique, or any other dispersion application technique commonly employed in the industry.

EXAMPLE 1 AND COMPARATIVE EXAMPLES 2 AND 3

A 27 weight percent acrylic acid copolymer with a melt index of 15 grams/10 minutes is dispersed in various alkaline aqueous metal hydroxide solutions according to the recipes listed in Table 1. The neutralization level for all samples (moles acid:moles base) is a constant 2.5.

TABLE 1

| Sample Number | Resin (grams) | NH$_4$OH (grams) | KOH (grams) | H$_2$O (grams) |
|---|---|---|---|---|
| 1 | 10.00 | 3.72 | 2.34 | 83.94 |
| 2* | 10.00 | 0.00 | 5.85 | 84.15 |
| 3* | 10.00 | 6.20 | 0.00 | 83.80 |

*Comparative example only; not an example of the invention

The test samples are each made by directly placing all ingredients in a 150 ml 3 neck round bottom flask fitted with a condenser, a thermometer and an air driven stirrer. Water is added into the flask first, then the resin. In sample 1, the KOH is added next and then the NH$_4$OH added last and the flask closed. The continuously stirred samples are heated to 95° C. and held constant. The samples are cooled to 50° C. and filtered through a tared 100 mesh stainless steel screen. The amount of material remaining on the screen after rinsing and drying for 24 hours at 90° C. was termed "non-dispersibles". The percent non-dispersibles was calculated by dividing the grams of material retained in the filter by the initial weight of resin added to the flask. The solids content of the dispersions is obtained by removing an aliquot of the filtered dispersion, recording its wet weight and subsequently drying under heat until the weight change is minimal. The solids content is recorded as the dry weight of the dispersion aliquot after removal of non-dispersibles, divided by the wet weight of the aliquot, multiplied by 100. The results for the three dispersions prepared according to the above recipes are tabulated below in Table 2.

TABLE 2

| Example | Non-dispersible (weight %) | Stable Viscosity (cps) | Approximate Solids Content (weight %) |
|---|---|---|---|
| 1 | 0.32 | 29 | 11.5 |
| 2* | 85.0 | 10 | 2.1 |
| 3* | 64.2 | 14 | 3.6 |

*Comparative example only; not an example of the invention

Non-dispersibles greater than 1.0 percent by weight are excessive and the dispersion is considered unsuccessful. Viscosity of the dispersion is determined using a Brookfield viscometer using a #2 spindle after two weeks aging at room temperature and pressure.

EXAMPLE 4 AND COMPARATIVE EXAMPLES 5 AND 6

An ethylene/acrylic acid interpolymer having about 14.57 percent by weight acrylic acid and a melt index of 24.04 grams/10 minutes (125° C./2.16 kg) is dispersed using the recipes described in Table 3. The neutralization level for all samples is 1.5:1 (moles acid/moles base).

TABLE 3

| Example | Resin (grams) | NH4OH (grams) | NaOH (grams) | H2O (grams) |
|---|---|---|---|---|
| 4 | 10 | 1.33 | 0.45 | 88.22 |
| 5* | 10 | 2.00 | 0.00 | 88.00 |
| 6* | 10 | 0.00 | 1.35 | 88.65 |

*Comparative example only; not an example of the invention

This sample is prepared in a manner analogous to that described above. The results for this sample are also determined in the aforementioned manner. The dispersion criteria is the same as above; test results are listed in Table 4.

TABLE 4

| Example | Non-dispersible (weight %) | Stable Viscosity (cps) | Approximate Solids Content (weight %) |
|---|---|---|---|
| 4 | 0.04 | 48 | 10.3 |
| 5* | 22.5 | 21 | 7.8 |
| 6* | 32.4 | 18 | 7.5 |

*Comparative example only; not an example of the invention

EXAMPLE 7 AND COMPARATIVE EXAMPLES 8 AND 9

An ethylene/acrylic acid interpolymer having about 15.47 percent by weight acrylic acid and a melt index of about 20.0 grams/10 minutes (190° C./2.16 kg) is dispersed according to the recipes described in Table 5. The ratio of acid to base (moles:moles) is 2.5.

TABLE 5

| Example | Resin (grams) | NH4OH (grams) | KOH (grams) | H2O (grams) |
|---|---|---|---|---|
| 7 | 10 | 2.13 | 1.34 | 86.53 |
| 8* | 10 | 3.55 | 0.00 | 86.45 |
| 9* | 10 | 0.00 | 3.35 | 86.65 |

*Comparative example only; not an example of the invention

Dispersion test results are listed in Table 6.

TABLE 6

| Example | Non-dispersible (weight %) | Stable Viscosity (cps) | Approximate Solids Content (weight %) |
|---|---|---|---|
| 7 | 0.16 | 64 | 10.9 |
| 8* | 18 | 22 | 8.2 |
| 9* | 23 | 19 | 9.5 |

*Comparative example only; not an example of the invention

EXAMPLE 10 AND COMPARATIVE EXAMPLE 11 AND 12

A 9.80 weight percent acrylic acid copolymer with a melt index of 20.0 at 190° C./2,16 kg is dispersed according to the following recipes. The molar ratio of acid to base is 2.5:1. This sample is prepared in a sealed one liter stainless steel reaction kettle at a digestion temperature of 145° C. Table 7 lists the dispersion formulations and Table 8 lists the properties of the formed dispersions.

TABLE 7

| Example | Resin (grams) | NH4OH (grams) | KOH (grams) | H2O (grams) |
|---|---|---|---|---|
| 10 | 10 | 1.28 | 0.80 | 87.92 |
| 11* | 10 | 2.12 | 0.00 | 87.88 |
| 12* | 10 | 0.00 | 2.01 | 87.99 |

*Comparative example only; not an example of the invention

TABLE 8

| Example | Non-dispersible (weight %) | Stable Viscosity (cps) | Approximate Solids Content (weight %) |
|---|---|---|---|
| 10 | 0.4 | 140 | 10.5 |
| 11* | 88 | 14 | 1.2 |
| 12* | 72 | 22 | 3.2 |

*Comparative example only; not an example of the invention

What is claimed is:

1. In a method of forming an aqueous dispersion of at least one ethylene/$\alpha,\beta$-unsaturated carboxylic acid interpolymer comprising contacting the interpolymer(s) in a stirred aqueous medium with a mixture of bases, the improvement characterized by contacting the interpolymer with at least about 0.2 equivalents of base per mole of $\alpha,\beta$-unsaturated carboxylic acid, said base being a mixture of monoethanolamine, diethanolamine or ammonium hydroxide and at least one alkali metal hydroxide in a ratio of from about 1.5 to about 3 moles of ammonium hydroxide per mole of alkali metal hydroxide, thereby forming a dispersion having at least about 10 weight percent of dispersed solids, total weight basis at not more than about 1 weight percent of non-dispersibles, based on the weight of the interpolymer.

2. The method of claim 1 wherein the solids content of the dispersion is at least about 25 weight percent, total weight basis.

3. The method of claim 1 wherein the mixture of base is a mixture of ammonium hydroxide and at least one alkali met hydroxide.

4. The method of claim 3 wherein the alkali metal hydroxide is lithium hydroxide, potassium hydroxide or sodium hydroxide.

5. The method of claim 4 wherein the mixture is ammonium hydroxide and potassium hydroxide.

6. The method of claim 5 wherein the ethylene/$\alpha,\beta$-unsaturated carboxylic acid interpolymer is an ethylene/acrylic acid interpolymer.

7. The method of claim 6 wherein the mixture of ammonium hydroxide and potassium hydroxide is at a total ratio of from about 1.5:1 to about 3:1.

8. The method of claim 7 wherein the ammonium hydroxide:acrylic acid molar ratio is about 1:1 and the potassium hydroxide:acrylic acid molar ratio is from about 0.6–0.8:1.

9. The method of claim 1 wherein the aqueous medium additionally contains an alcohol of 1 to 4 carbon atoms.

10. An aqueous dispersion produced by the method of claim 1.

11. Film produced from the dispersion of claim 10.

12. The method of claim 1 wherein the ratio of ammonium hydroxide:$\alpha,\beta$-unsaturated carboxylic acid molar ratio is about 1:1 and the alkali metal hydroxide:$\alpha,\beta$-unsaturated carboxylic acid molar ratio is from about 0.6–0.8:1.

13. The method of claim 1 wherein said interpolymer is contacted sequentially first with one of the alkali metal hydroxides, either in an aqueous or non-aqueous environment, and then contacted with ammonium hydroxide or a mixture of ammonium hydroxide and another of the alkali metal hydroxides in an aqueous medium.

14. The method of claim 1 wherein the ethylene/$\alpha,\beta$-unsaturated carboxylic acid interpolymer is an ethylene/acrylic acid interpolymer.

* * * * *